US008901798B2

(12) United States Patent
Ramu et al.

(10) Patent No.: US 8,901,798 B2
(45) Date of Patent: Dec. 2, 2014

(54) SWITCHED RELUCTANCE MACHINES WITH MINIMUM STATOR CORE

(75) Inventors: Krishnan Ramu, Blacksburg, VA (US); Nimai Lobo, Blacksburg, VA (US); Cheewoo Lee, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 606 days.

(21) Appl. No.: 12/601,903

(22) PCT Filed: May 30, 2008

(86) PCT No.: PCT/US2008/006828
§ 371 (c)(1),
(2), (4) Date: Nov. 25, 2009

(87) PCT Pub. No.: WO2008/153832
PCT Pub. Date: Dec. 18, 2008

(65) Prior Publication Data
US 2010/0141061 A1 Jun. 10, 2010

Related U.S. Application Data

(60) Provisional application No. 60/932,382, filed on May 31, 2007, provisional application No. 60/933,605, filed on Jun. 7, 2007, provisional application No. 60/955,609, filed on Aug. 13, 2007.

(51) Int. Cl.
*H02K 19/12* (2006.01)
*H02K 1/14* (2006.01)
*H02K 19/10* (2006.01)

(52) U.S. Cl.
CPC ............... *H02K 1/14* (2013.01); *H02K 19/106* (2013.01)
USPC ...... 310/216.021; 310/216.075; 310/216.097; 310/46; 310/166

(58) Field of Classification Search
CPC ..................................................... H02K 1/148
USPC ............. 310/46, 166–172, 216.021–216.039, 310/216.075, 216.097, 216.071–216.73
See application file for complete search history.

(56) References Cited

U.S. PATENT DOCUMENTS 4,475,051 A * 10/1984 Chai et al. ................... 310/49.44
4,748,362 A * 5/1988 Hedlund ....................... 310/168
(Continued)

FOREIGN PATENT DOCUMENTS

JP 61-218355 A 9/1986
JP 6-217515 A 8/1994
(Continued)

OTHER PUBLICATIONS

Deodhar et al., The Flux-Reversal Machine: A New Brushless Doubly-Salient Permanent-Magnet Machine, IEEE Industry Applications Conference, 1996, vol. 2, pp. 786-793.*

(Continued)

*Primary Examiner* — Burton Mullins
*Assistant Examiner* — Eric Johnson
(74) *Attorney, Agent, or Firm* — Armstrong Teasdale LLP

(57) ABSTRACT

A two-phase switched reluctance machine is provided using discontinuous core structures as the stator for low-cost, high-performance drives. This discontinuous stator core structure contains short flux paths and maximum overlap between the rotor poles and stator poles in the stator discontinuous core structures, regardless of the rotor position. Example configurations of such core structure include E-core, L-core and I-core configurations. Using less steel and magnet wire than in conventional SRM designs results in cost savings of stator material and winding material. Efficiency of this novel SRM is improved because of shorter flux paths resulting in reduction of core losses and decreased phase resistance resulting in reduction of copper losses. Two-phase simultaneous excitation of the novel SRM can reduce torque ripple during commutation as compared with existing two-phase SRMs.

39 Claims, 17 Drawing Sheets

(56) References Cited

U.S. PATENT DOCUMENTS

| | | | |
|---|---|---|---|
| 4,990,809 A * | 2/1991 | Artus et al. | 310/192 |
| 5,041,749 A * | 8/1991 | Gaser et al. | 310/156.22 |
| 5,672,925 A * | 9/1997 | Lipo et al. | 310/154.11 |
| 6,262,510 B1 * | 7/2001 | Lungu | 310/216.023 |
| 6,724,117 B1 * | 4/2004 | Lungu | 310/179 |
| 2002/0125782 A1 | 9/2002 | Peachee | |
| 2004/0155548 A1 * | 8/2004 | Rasmussen | 310/168 |
| 2005/0156475 A1 | 7/2005 | Ramu | |
| 2006/0273684 A1 | 12/2006 | Ishikawa | |
| 2006/0279155 A1 * | 12/2006 | Holtzapple et al. | 310/168 |

FOREIGN PATENT DOCUMENTS

| | | |
|---|---|---|
| JP | 8-191563 A | 7/1996 |
| JP | 10-505998 A | 6/1998 |
| JP | 2004-527994 A | 9/2004 |
| JP | 2005-528076 A | 9/2005 |
| JP | 2006-174699 A | 6/2006 |
| WO | 02/095902 | 11/2002 |
| WO | 2005/022738 | 3/2005 |

OTHER PUBLICATIONS

Kin et al., JP8191563A Machine Translation, Jul. 1996.*
Kuphaldt, Tony R. "Lessons in Electric Circuits", pp. 422-425.*
Kuphaldt, Tony R. "Lessons in Electric Circuits", pp. 422-425, Jun. 2006.*
International Search Report dated Aug. 14, 2008 with Written Opinion.
Japanese Notice of Reasons for Rejection mailed Oct. 30, 2012, issued in counterpart Japanese Patent Application No. JP-2010-510349; 8 pages including English translation.

* cited by examiner (a) (b)

SWITCHED RELUCTANCE MACHINES WITH MINIMUM STATOR CORE

This application claims priority to international application PCT/US2008/006828, filed May 30, 2008, which claims priority to U.S. provisional applications 60/932,382, filed May 31, 2007, 60/933,605, filed Jun. 7, 2007, and 60/955,609, filed Aug. 13, 2007.

RELATED APPLICATIONS

The present application hereby claims the benefit of U.S. Provisional Patent Application Ser. No. 60/932,382, which was previously filed by the same inventors on May 31, 2007, U.S. Provisional Patent Application Ser. No. 60/933,605, which was previously filed by the same inventors on Jun. 7, 2007, and U.S. Provisional Patent Application Ser. No. 60/955,609, which was previously filed by one of the same inventors on Aug. 13, 2007.

FIELD OF THE INVENTION

The disclosure herein relates to the field of switched reluctance motors and, more particularly, to a novel two-phase switched reluctance machine that minimizes the size of the stator core by employing a stator comprising two or more physically separate and discontinuous core structures.

BACKGROUND OF THE INVENTION

Induction motors and universal motors are being used in most applications requiring constant-speed and low-horsepower, mainly because of their competitive cost. To replace such conventional motors, research has been conducted on single-phase switched reluctance motor ("SRM") drives over the last decade. However, single-phase SRM drives are not suitable for high performance applications since they have some inherent limitations, including low output power density and only a 50% duty cycle of torque generation. They also require an additional component in the form of permanent magnets or auxiliary windings for self-starting.

Because of the known deficiencies of single-phase SRMs, more attention has been paid to two-phase SRM drives, especially for high torque and/or high-efficiency applications. For instance, two-phase SRM drives are positioned as brushless motor drives in variable-speed applications, such as those found in home appliances and power tools. One drawback of conventional two-phase SRM drives is their cost. Two-phase SRM drives typically may require equal, more, or less steel and magnet wire than single-phase SRMs and multiphase (greater than 2 phases) SRMs. Thus, one of the ways that two-phase SRM drives can distinguish themselves in the marketplace is by reducing their cost in comparison to conventionally available SRMs and hence to all other machines that are in practice.

Accordingly, it is generally desirable to provide a low-cost, two-phase SRM drive that can be deployed in high torque and/or high-efficiency applications. The two-phase SRM drive should cost less than currently available two-phase SRM drives without having to sacrifice torque output or motor efficiency.

SUMMARY OF THE INVENTION

In accordance with the invention, a novel two-phase SRM ("TPSRM") drive that minimizes the size of the stator core by using physically separate and discontinuous core structures is disclosed. Generally, the discontinuous core structures allow less stator core material and less magnet wire to be used in a TPSRM, which results in significant cost savings. Additionally, this generally shortens the path lengths of magnetic flux paths or loops during phase excitations and can be configured to operate with substantially no flux reversals in its stator core. As a result, the inventive TPSRM drive may reduce core losses and operate at a higher efficiency than prior TPSRM implementations.

According to one aspect of the present invention, a TPSRM having a stator comprising at least two discontinuous core structures is described. The stator core comprises at least first and second discontinuous core structures positioned around the rotor. The rotor has at least two rotor poles, and each of the discontinuous core structures has at least one stator pole through which magnetic flux passes during phase excitations of the TPSRM. Additionally, concentric coils are wound around the stator poles of the discontinuous core structures. Activation of selected concentric coils causes the TPSRM to achieve a desired phase excitation.

In another aspect of the present invention, another TPSRM having a stator comprising at least two physically separate and discontinuous core structures disposed around the rotor is described. The rotor has rotor poles that each have the same pitch. Each of the rotor poles further have an arc shaped surface. The discontinuous core structures of the stator in accordance with this aspect of the invention comprise a main outer segment from which stator poles extend, and through which magnetic flux can pass during phase excitations of the TPSRM. In this embodiment, the stator poles are dimensioned such that one arced surface of a rotor pole faces a stator pole at all times, regardless of rotor position. Finally, according to this aspect of the present invention, concentric coils are positioned around a stator pole located on each discontinuous core structure. Activation of selected concentric coils causes the TPSRM to achieve the desired phase excitation.

In yet another aspect of the present invention, a TPSRM is disclosed that includes a rotor, a stator, and concentric coil windings. The rotor comprises rotor poles that each have the same pitch. The stator comprises a first and second discontinuous core structure that has a main outer segment. The main outer segments according to this aspect of the present invention are arc-shaped and each have stator poles through which magnetic flux passes during phase excitations of the TPSRM. At least one common stator pole having a predefined pole arc is present on each discontinuous core structure. The length of the pole arc of the common pole on each of the two discontinuous core structures is dimensioned so that it equals the rotor pitch of the rotor poles. Finally, according to this aspect of the present invention, concentric coils are wound around the stator poles of the first and second discontinuous core structures. Activation of selected concentric coils causes the TPSRM to achieve a desired phase excitation.

In still another aspect of the present invention a TPSRM is disclosed that includes a rotor, a stator, and concentric coil windings. The rotor comprises rotor poles that each have the same pitch. The stator comprises a first and second discontinuous core structure that has a main outer segment. The main outer segments according to this aspect of the present invention are shaped in an angled configuration and each have stator poles through which magnetic flux passes during phase excitations of the TPSRM. At least one common stator pole having a redefined pole arc is present on each discontinuous core structure. The length of the pole arc of the common pole on each of the two discontinuous core structures is dimensioned so that it equals the rotor pitch of the rotor poles. Finally, according to this aspect of the present invention, concentric coils are wound around the stator poles of the first and second discontinuous core structures. Activation of selected concentric coils causes the TPSRM to achieve a desired phase excitation.

In even another aspect of the present invention, a TPSRM is disclosed that includes a rotor, a stator, and concentric coil windings. The rotor comprises rotor poles that each have the same pitch. The stator comprises a first and second discontinuous core structure that has a main outer segment. The main outer segments according to this aspect of the present invention are substantially straight and each have stator poles through which magnetic flux passes during phase excitations of the TPSRM. At least one common stator pole having a predefined pole arc is present on each discontinuous core structure. The length of the pole arc of the common pole on each of the two discontinuous core structures is dimensioned so that it equals the rotor pitch of the rotor poles. Finally, according to this aspect of the present invention, concentric coils are wound around the stator poles of the first and second discontinuous core structures. Activation of selected concentric coils causes the TPSRM to achieve a desired phase excitation.

Additional advantages of aspects of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The drawings, which are incorporated in and constitute a part of this specification, illustrate embodiments of the invention and together with the description, serve to explain the principles of the invention. Wherever possible, the same reference numbers will be used throughout the drawings to refer to the same or like parts.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Examples of a novel two-phase SRM drive using physically separate and discontinuous core structures with minimum stator iron core are disclosed for high torque applications using short-pitch windings (i.e., concentric coil windings). Generally, the principles of such an SRM drive are explained below with reference to an exemplary "E-core" configured embodiment where the discontinuous stator core structures each have an arced main outer segment and are each shaped like an "E" with their respective poles. Other exemplary embodiments of the stator core structure use an angled main outer segment and are referred to as an "L-core"

configuration while still other embodiments use a substantially straight main outer segment and are referred to as an "I-core" configuration.

As discussed below, the inventive discontinuous core structure design of the two-phase SRM provides significant cost savings. More generally, the disclosed discontinuous core structures, including the exemplary E-core, L-core, and I-core structures described herein, are applicable for an SRM drive having any number of phases. However, for simplicity, a two-phase magnetic structure is discussed below by way of example. Those skilled in the art will appreciate that other multi-phase SRM drives may be realized in accordance with the invention using one or more of the discontinuous core structures described herein.

The components, principles of operation, and advantages of the present invention, discussed by reference to FIGS. 1-15 below, pertain generally to all embodiments of the present invention. However, for simplicity, the components, principles of operation, and advantages of the E-core structure are disclosed by way of example. Those skilled in the art will appreciate that other embodiments of the disclosed SRM drives with a stator comprising discontinuous core structures, including the L-core (see FIG. 16) and I-core (see FIG. 17) embodiments described herein, are equally exemplary of the present invention.

Figure 1:
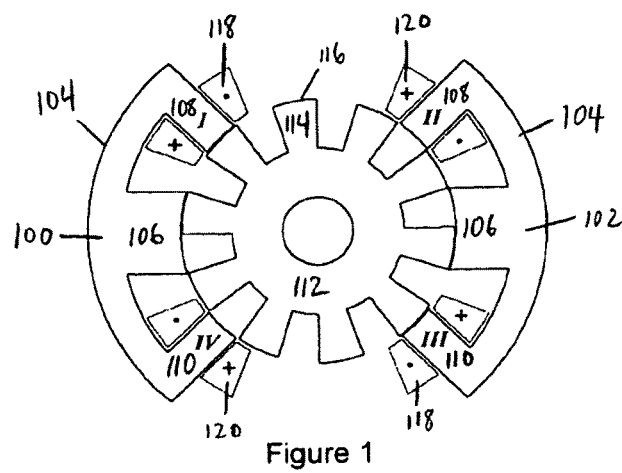
FIG. 1 is an exemplary two-phase common stator pole E-core structure that may be employed in a two-phase SRM drive in accordance with an embodiment of the present invention.

FIG. 1 illustrates the cross-sectional view of an example of the invented two-phase SRM with discontinuous core structures. This first exemplary embodiment of the invention has two discontinuous core structures 100, 102 which each have a main outer segment 104 between their respective poles 106, 108, 110. The two main outer segments 104 of each discontinuous core structure 100, 102 in this exemplary embodiment of the present invention are arc-shaped in the E-core configuration. Each arc-shaped main outer segment of the stator core structures 100, 102 of the exemplary E-core embodiment has one large, common stator pole 106 without windings and two smaller stator poles 108, 110 with windings 118, 120. The rotor 112 has ten poles 114 with asymmetric pole faces 116 which form a non-uniform air gap with respect to a stator pole 108, 110 to produce positive motoring torque continuously. The concept of this exemplary 6/10 E-core SRM is as follows:

1) Magnetic structure: This structure is an alternative to conventional two-phase SRMs. Phase-A windings 118 are positioned on diametrically opposite poles, for example, poles I and III for phase-A, in a short-pitch manner, and phase-B oils 120 are wound on poles II and IV, having the same number of turns as phase-A.

Figure 2:
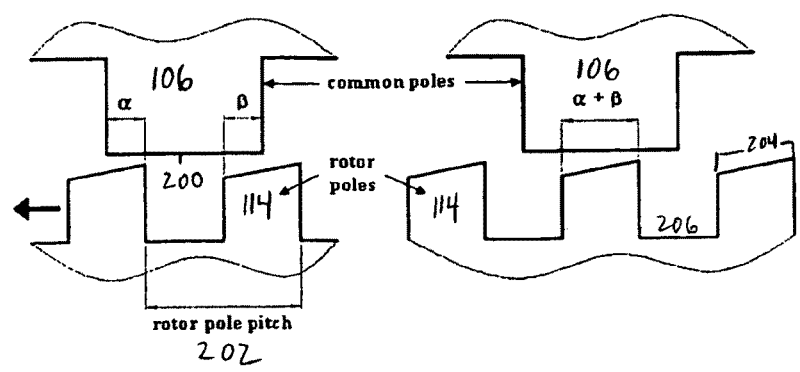
FIG. 2 is a magnified view of the exemplary magnetic structure around a common stator pole of the E-core structure shown in FIG. 1.

2) Common stator pole: FIG. 2 illustrates a close-up view of the structural configuration around a common stator pole 106. The common stator pole 106 is placed between two smaller stator poles (not shown) in the stator and its pole arc 200 is designed to be the same as one rotor pole pitch 202. The rotor pole pitch 202 is equal to the sum of the width of a rotor pole 204 and the width of a rotor slot 206. Thus, the effective width of the flux paths below one common stator pole 106, α+β (see FIG. 2), is always equal to one rotor pole width 204 regardless of the overlap configuration between common stator pole 106 and rotor poles 114. Based on the total overlap of the common stator pole 106 with respect to the rotor poles 114, the reluctance of the effective air gap around the common stator pole 106 is always constant and minimum in this novel magnetic structure at all rotor positions.

Figure 3:
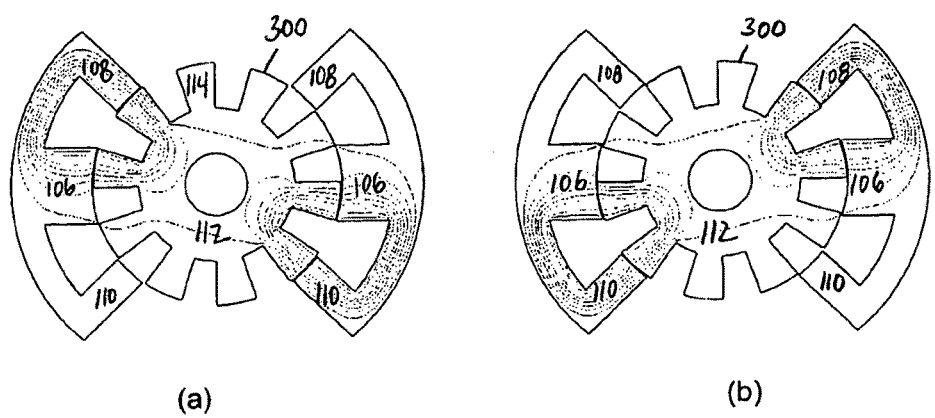
FIGS. 3(a)-(b) are illustrations of exemplary magnetic flux paths, calculated using finite element analysis ("FEA"), for excited phase windings in two different SRM phases in accordance with an embodiment of the present invention.

On the other hand, a set of two smaller stator poles (not shown) in the stator for phase-A or phase-B excitation experiences variable reluctance as the rotor moves. Referring now to FIGS. 3(*a*)-(*b*), the flux lines through a common stator pole 106, rotor poles 114, and a smaller stator pole 108 in case of phase-A and smaller stator pole 110 in case of phase-B excitation, are respectively illustrated. As a result, the common stator pole 106 does not develop variable reluctance by itself; instead it provides a pair of smaller stator poles 108, 110 with wide flux paths when the phase windings are energized at certain rotor positions. The magnetic structure using physically separate and discontinuous core structures, including the exemplary E-core, L-core, or I-core structures as described herein, leads to advantageously short flux paths and overlap of equivalently one arced surface of a rotor pole 300 at any rotor position. Therefore, this novel discontinuous core structure in an SRM is able to generate more torque under the condition that it has the same magneto-motive force (MMF) as an existing two-phase SRM with short-pitch windings. There is additional cost reduction because of smaller stator laminations in the discontinuous core structures as shown in embodiments of the present invention.

General Principle of Operation

Figure 4:
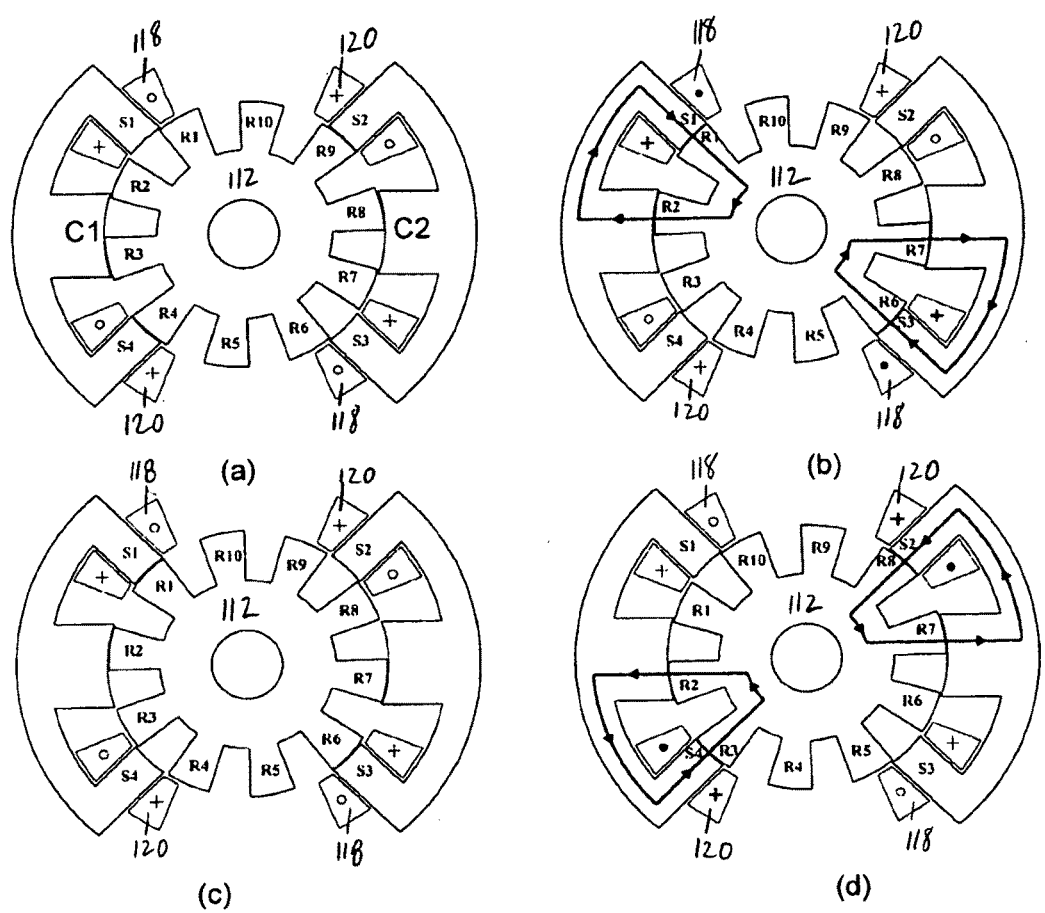
FIGS. 4(a)-(d) are illustrations of an exemplary excitation sequence to cause rotation of a two-phase SRM drive in accordance with an embodiment of the present invention.

Referring now to FIGS. 4(*a*)-(*d*), the general principle of operation for embodiments of the present invention is described. In order to cause the rotor 112 in this machine to rotate in the counter clockwise direction, the following excitation sequence is applied in an embodiment of the present invention. As shown in FIG. 4(*a*), the rotor poles R1 and R6 are unaligned with respect to phase A stator poles S1 and S3, respectively. In this position the rotor poles R1 and R6 are in the fully unaligned position and have maximum reluctance with respect to phase A. Phase A windings 118 are energized, causing the rotor poles R1 and R6 to align themselves with stator poles S1 and S3, bringing them to the position of minimum reluctance or full alignment, shown in FIG. 4(*b*). At this position phase A windings 118 have to be turned off or de-energized. At this phase A aligned position, rotor poles R3 and R8 are unaligned with respect to stator poles S4 and S2, respectively. Energizing phase B windings 120 as shown in FIG. 4(*c*) will cause the rotor to rotate and rotor poles R3 and R8 will align themselves with stator poles S4 and S2, shown in FIG. 4(*d*). At the rotor position shown in FIG. 4(*d*), phase B windings 120 are turned off. To achieve continued rotation, phase A 118 and phase B 120 windings have to be energized and de-energized sequentially according to the rotor position. This causes unaligned rotor poles to align themselves with adjacent stator poles.

Figure 5:
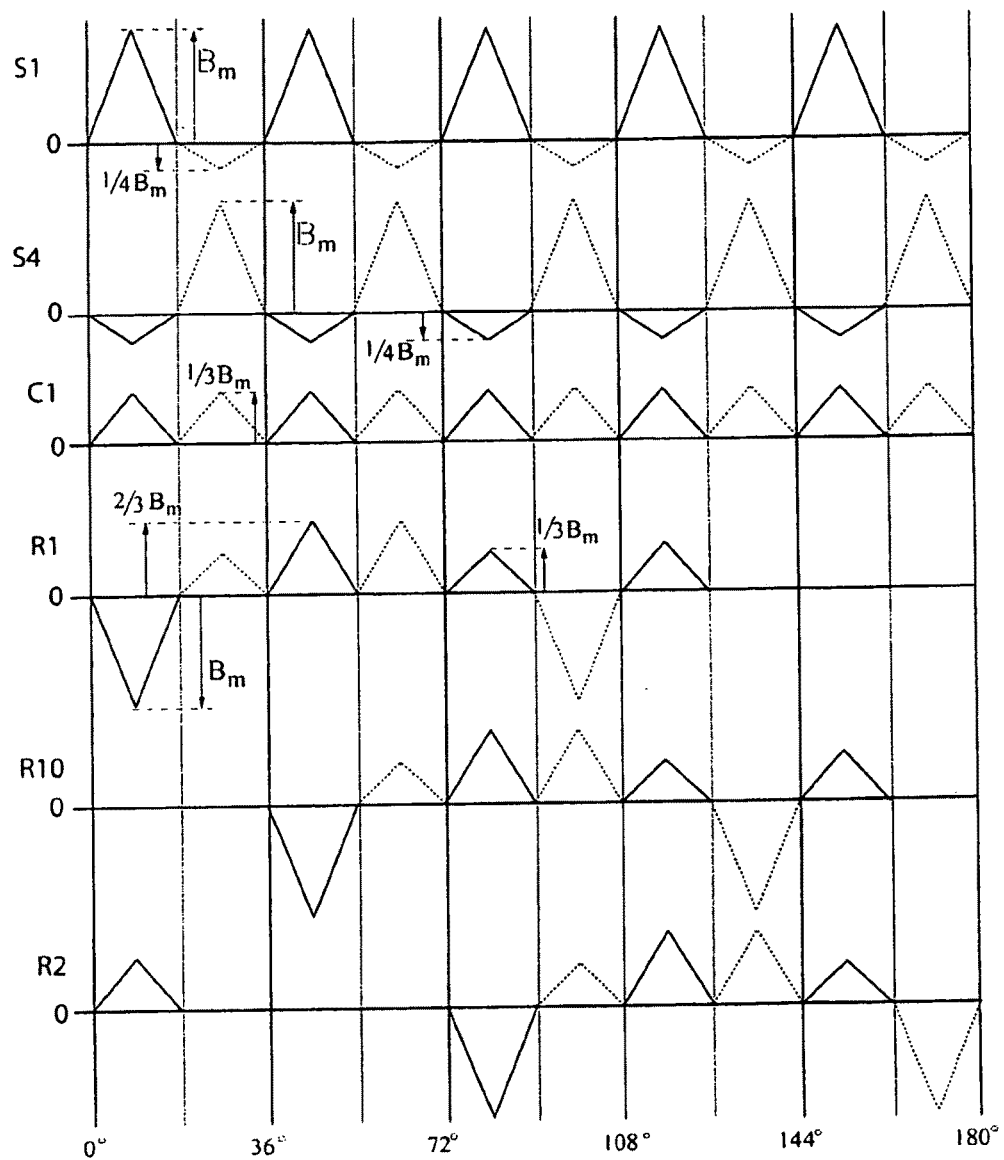
FIG. 5 is an illustration of the flux density in the various stator core structures during sequential phase excitation of an exemplary E-core SRM in accordance with an embodiment of the present invention.

FIG. 5 shows the excitation sequence along with the flux density in the various iron sections of an embodiment of the present invention. As shown in FIG. 5, the solid lines indicate Phase A excitation and dotted lines indicate Phase B excitation. The flux in a wound stator pole 118, 120 reverses every 36° and its peak magnitude during reversal is around one-quarter of the flux density in the excited pole.

Alternative Two-Phase Simultaneous Excitation:

To obtain self-starting and continuous torque at any rotor position, wide rotor pole arc with asymmetric pole surfaces is used in a conventional two-phase SRM.

In this case, two-phase SRMs have an innate weakness in terms of smooth torque production during phase commutation compared to multi-phase SRMs for the following reasons. A two-phase SRM with wide rotor pole experiences large negative torque with a steep slope after the positive torque generation region, and current conduction in the phase windings has to be turned off in advance before the end of the positive torque region because of a long tail current during phase commutation. Furthermore, it is often very difficult to build up phase current rapidly by using advance-excitation of phase windings without any negative torque. As a result, these two characteristics may cause an undesirable torque ripple during phase commutation in a two-phase SRM, hence resulting in greater acoustic noise. In a conventional two-phase 4/2 SRM, it is difficult to overcome the problem of torque ripple during commutation.

Figure 6:
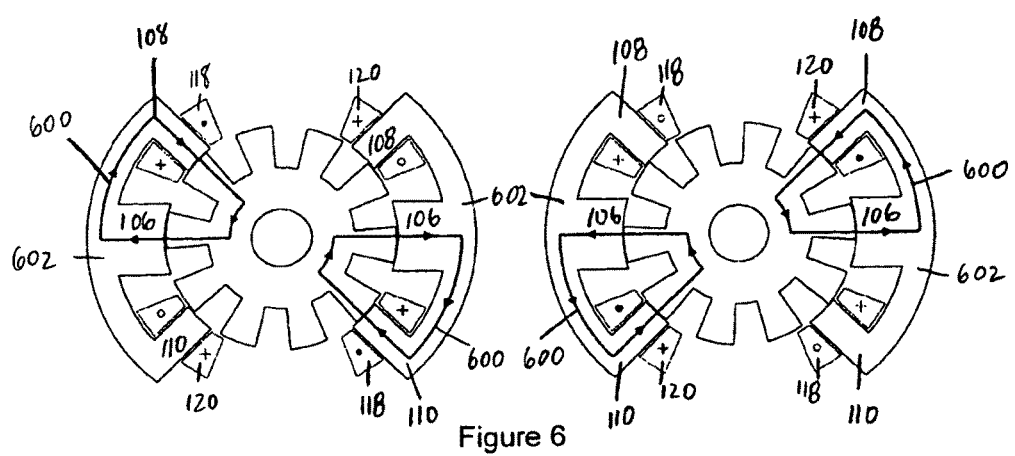
FIG. 6 is an illustration of the excitation for an exemplary common stator pole E-core 6/10 SRM in accordance with an embodiment of the present invention.
Figure 7:
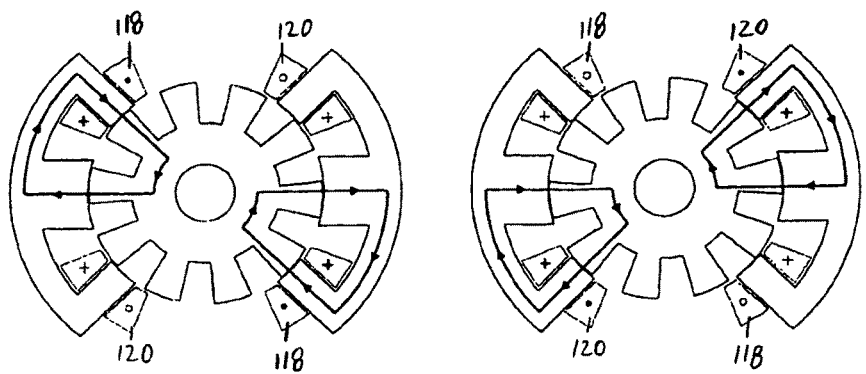
FIG. 7 is an illustration of the excitation for two-phase simultaneous excitation and its flux paths using an exemplary common stator pole E-core 6/10 SRM in accordance with an embodiment of the present invention.
Figure 8:
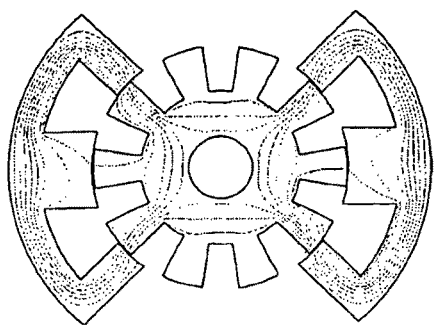
FIG. 8 is a schematic diagram showing FEA calculated magnetic flux paths in the exemplary common stator pole E-core 6/10 SRM using two-phase simultaneous excitation in accordance with an embodiment of the present invention.

Advantageously, two-phase excitation of the novel discontinuous core structure SRM reduces torque ripple. The exemplary excitation method shown in FIG. 6 is more advantageous for core-loss reduction and reducing torque ripple during commutation. An alternative two phase excitation method after reversing the polarity of phase-B windings 120 is also feasible, for example, as shown in FIG. 7. There is no difference in torque performance due to the polarity of phase-B windings 120 during excitation. When both phase windings 118, 120 are energized at the same time with reversed polarity in phase-B windings 120 the flux paths are changed as shown in FIG. 8. It is understood that this mode of operation is applicable during commutation of phase currents and not during the entire current conduction period of phase windings.

Figure 9:
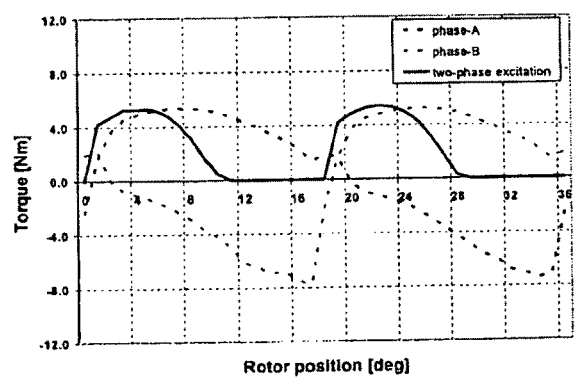
FIG. 9 is a graph showing torque performance of two-phase simultaneous excitation determined using FEA for an exemplary common stator pole E-core 6/10 SRM in accordance with an embodiment of the present invention.

As shown in FIG. 9, the two-phase excitation adds more torque to both phases during commutation, and significantly increases the torque build-up compared to single-phase excitation. With this exemplary method, continuous torque production and torque ripple can be improved during commutation.

Referring now to FIGS. 10 through 15, the torque enhancement, cost savings, and absence of flux reversal in the exemplary discontinuous stator core structures in embodiments of the present invention will be discussed.

Torque Enhancement:

Based on equations for an SRM, the discontinuous core structure, including the exemplary E-core, L-core, and I-core embodiments described herein, is further explained. Electromagnetic torque and inductance obtained from an SRM are expressed as $$T(\theta, i) = \frac{1}{2} i^2 \frac{dL}{d\theta} \tag{1}$$

$$L = \frac{\lambda}{i} = \frac{N\phi}{i} = \frac{N\frac{mmf}{\mathcal{R}}}{i} = \frac{N\frac{Ni}{\mathcal{R}}}{i} = \frac{N^2}{\mathcal{R}} \tag{2}$$

where T, i, L, $\theta$ are electromagnetic torque, phase current, phase inductance, and rotor position, respectively. $\lambda$, N, $\phi$, mmf, $\mathcal{R}$ are flux linkage, number of turns per phase, flux, magneto-motive force, and reluctance of the entire magnetic circuit, respectively.

Substituting (2) into (1) yields $$T(\theta, i) = \frac{1}{2} i^2 \frac{d}{d\theta}\left[\frac{N^2}{\mathcal{R}}\right] \tag{3}$$

$$= \frac{1}{2}(i \cdot N)^2 \left(-\frac{1}{\mathcal{R}^2}\right)\frac{d\mathcal{R}}{d\theta}$$

$$= -\frac{1}{2}\left[\frac{mmf}{\mathcal{R}}\right]^2 \frac{d\mathcal{R}}{d\theta}$$

Figure 10:
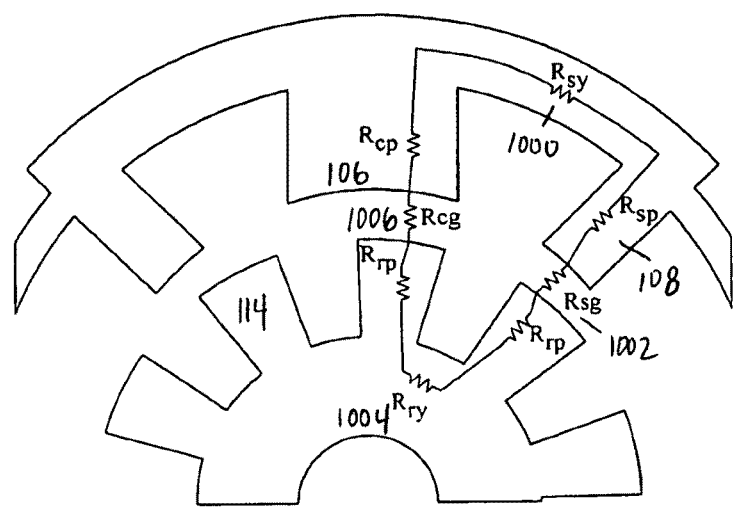
FIG. 10 is a schematic diagram of an equivalent magnetic circuit corresponding to an exemplary E-core in accordance with an embodiment of the present invention.

In equation (3) above, note that $\mathcal{R}$ is the reluctance of the entire magnetic circuit in a two-phase SRM. The overall reluctance is divided into seven individual components as shown in FIG. 10. It is to be noted that the reluctance of the path that experiences a minor flux reversal is ignored due to the fact that the flux density of the reversal path is minor compared to the dominant seven individual components shown in FIG. 4.

Referring now to FIG. 10, $R_{cp}$, $R_{sy}$, $R_{sp}$, $R_{sg}$, $R_{rp}$, $R_{ry}$, and $R_{cg}$ are the reluctances of the common stator pole 106, stator back iron 1000, smaller stator pole 108, air gap facing the small pole 1002, rotor pole 114, rotor yoke 1004 and air gap facing the common stator pole 1006, respectively. The reluctances of the iron core are dependent on the excitation MMF, and the two reluctances of the air gap $R_{sg}$, $R_{cg}$ are only a function of rotor position because of the constant permeability of air. However, the reluctance of the air gap facing the common stator pole, $R_{cg}$, is different from a conventional two-phase SRM in which both air gaps have equal reluctances.

This reluctance term in the discontinuous core structure SRM is constant because of the effect of the common stator pole 106 regardless of rotor position, but in the conventional 4/2 SRM, it is variable like the other three reluctance terms. Hence, equation (3) can be rewritten as $$T(\theta, i) = -\frac{1}{2}\left[\frac{mmf}{\begin{array}{c}R_{cp} + R_{sy} + R_{sp} + R_{sg} + \\ 2R_{rp} + R_{ry} + R_{cg}\end{array}}\right]^2 \times \frac{d\left(\begin{array}{c}R_{ep} + R_{sy} + R_{sp} + \\ R_{sg} + 2R_{rp} + R_{ry} + R_{eg}\end{array}\right)}{d\theta} \tag{4}$$

From equation (4) above, in the case of the discontinuous core structure SRM, $R_{cg}$ is constant and minimum at any rotor position. Consequently, equation (4) is derived as following.

$$T(\theta, i) = -\frac{1}{2}\left[\frac{mmf}{\begin{array}{c}R_{cp} + R_{sy} + R_{sp} + R_{sg} + \\ 2R_{rp} + R_{ry} + R_{eg}\end{array}}\right]^2 \times \frac{d\left(\begin{array}{c}R_{ep} + R_{sy} + R_{sp} + \\ R_{sg} + 2R_{rp} + R_{ry}\end{array}\right)}{d\theta} \tag{5}$$

Figure 11:
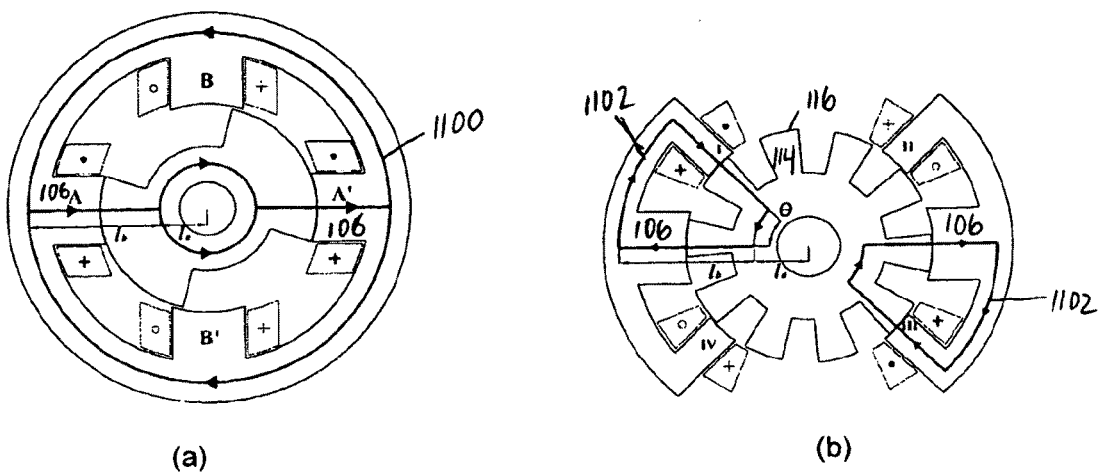
FIGS. 11(a)-(b) are illustrations of the excited magnetic flux paths for a conventional 4/2 SRM and for an exemplary common stator pole E-core 6/10 SRM in accordance with an embodiment of the present invention.

Referring now to FIG. 11, the flux lines in the discontinuous core structure SRM, as exemplified by the E-core, L-core, and I-core embodiments, are smaller in length than those in the conventional 4/2 SRM. In equation (5), the total reluctance of the stator ($R_{cp}+R_{sy}+R_{sp}$) and rotor ($2R_{rp}+R_{ry}$) in the discontinuous core structure SRM are significantly decreased due to shorter flux paths in stator and rotor iron, and reluctance of the small pole air gap, $R_{sg}$, is minimized because of full overlap of a common stator pole 106 with the arced surfaces of the rotor pole faces 116.

The mean flux paths 1100, 1102 shown in FIGS. 11(a) and 11(b) can be used to illustrate one of the advantages of the invention. For example, the lengths $l_a$ and $l_b$ are equal in both machines since their power levels are equivalent and are designed for the same application. The mean flux path length 1100 in the conventional 4/2 SRM, shown in FIG. 11(a), is:

$$l_{fc} = 2 \cdot l_b + \pi \cdot l_a + \pi \cdot (l_a + l_b) = 2 \cdot l_b + \pi \cdot (2 \cdot l_a + l_b) \tag{6}$$

The mean flux path length 1102 in the exemplary E-Core SRM shown in FIG. 11(b) is:

$$l_{fe} = 2 \cdot l_b + 0 \cdot l_a + 0 \cdot (l_a + l_b) = 2 \cdot l_b + 0 \cdot (2 \cdot l_a + l_b) \tag{7}$$

The ratio of the mean lengths of the flux paths in both SRMs 1100, 1102 is, (7)÷(6), $$\frac{l_{fe}}{l_{fc}} = \frac{2 \cdot l_b + 0 \cdot (2 \cdot l_a + l_b)}{2 \cdot l_b + \pi \cdot (2 \cdot l_a + l_b)} \tag{8}$$

In the exemplary E-Core SRM, the angle θ is, $$\theta = \frac{360°}{10} \times 1.5 = 54° = 0.942 \text{ radians} \quad (9)$$

$$\frac{l_{fe}}{l_{fe}} \approx 0.48 = 48\%$$

From equation (9), it can be seen that the discontinuous core structure SRM, as exemplified by a prototype exemplary E-Core SRM using prototype dimensions, only utilizes 48% of the core material compared to its counterpart, the conventional 4/2 SRM. This leads to the advantageous lower excitation MMF requirement and lower core-losses in the invented machine. Those skilled in the art will appreciate that similar lower excitation MMF requirements and lower core losses are also present in all other embodiments of the present invention.

It is also seen that torque performance in embodiments using discontinuous core structure is improved to cover high torque applications where an existing two-phase 4/2 SRM is not suitable.

Figure 12:
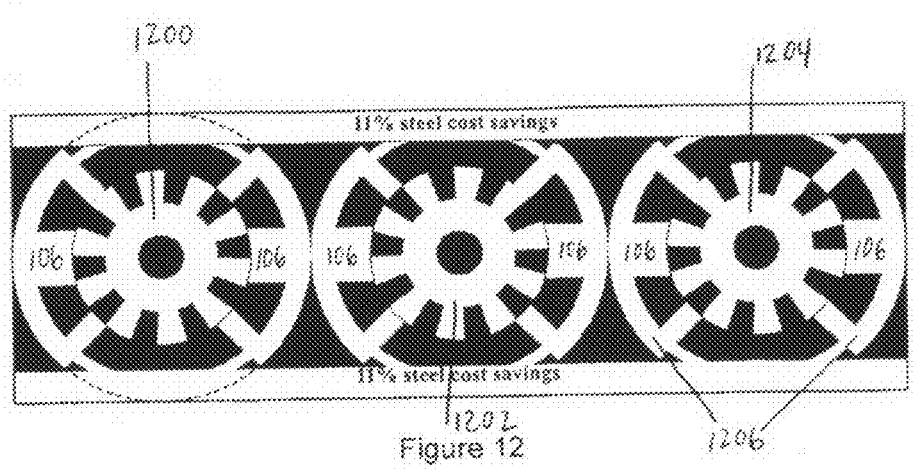
FIG. 12 is an illustration of the layout of stamped E-core SRMs in accordance with an embodiment of the present invention.

Cost Savings:

Compactness of embodiments using discontinuous stator core structure contributes to cost savings on steel. FIG. 12 illustrates a steel layout of three individual stator and rotor laminations 1200, 1202, 1204 after stamping them. It is seen that the compactness of the stator yoke 1206 results in comparatively smaller height of steel (totally 22% smaller) compared to a two-phase SRM with a single iron stator body like a 4/2 SRM, leading to significant cost and weight savings.

More Cost Savings:

Due to short flux paths and minimized air gap reluctance around common stator poles 106 in a discontinuous core structure SRM, this motor is able to develop more torque compared to a two-phase 4/2 SRM. On the other hand, some of the applications require more cost savings rather than high torque density. In this case, reducing number of turns in the novel SRM leads to more cost savings under the condition of generating same torque as the two-phase 4/2 SRM.

Figure 13:
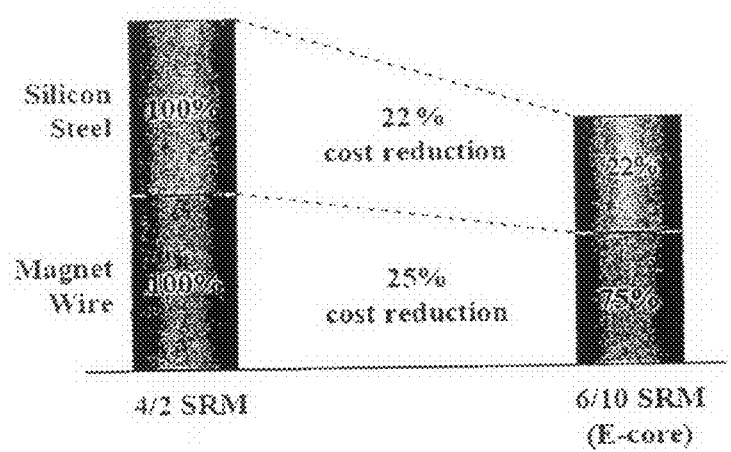
FIG. 13 is a chart comparing the cost to produce a conventional 4/2 SRM and an exemplary common-pole E-core 6/10 SRM in accordance with an embodiment of the present invention.
Figure 14:
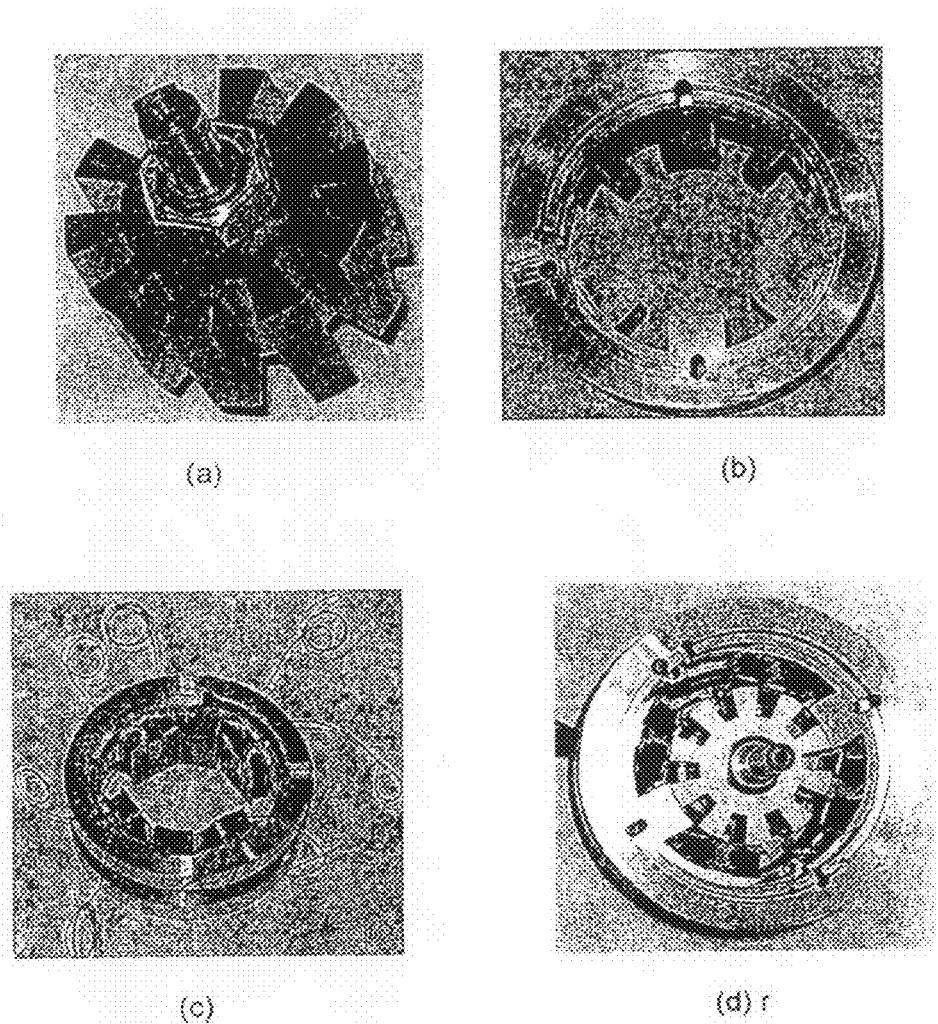
FIGS. 14(a)-(d) are photographs of an exemplary prototype two-phase SRM in accordance with an embodiment of the present invention.

FIG. 13 shows a comparison of material cost between an exemplary E-core SRM and an exemplary 4/2 SRM in the case of same torque output. In this example, only three-quarters of the total number of turns of the 4/2 SRM are used in the E-core SRM, and a 25% cost savings in magnet wire is obtained. As a result, at least 22% overall cost savings in materials including 25% wire and 22% steel savings is achievable with the common-pole E-core structure. A person of ordinary skill in the art will appreciate that similar levels of cost savings in materials is achievable in all embodiments of the present invention; such costs savings in materials are not limited to the E-core embodiment.

Flux Reversal Free Stator:

Another advantage of the exemplary 6/10 discontinuous core structure SRM in accordance with principles of the present invention results from flux flow in the stator 100, 102 shown in FIG. 6. During excitation of phase A 118 or B windings 120, flux paths 600 are denoted by solid lines with arrows so that they indicate the direction of the flux flow in the overall magnetic body. Note that the flux lines 600 are always in the same direction not only in the stator back iron 602 but also in the common stator pole 106 and smaller stator poles 108, 110. The common stator poles 106 are free of flux reversal in the invention. The smaller stator poles 108,110 and the adjacent stator back iron 602 experience some flux reversals during unaligned position of the rotor 112 and it is not very significant. That is not true in the case of a conventional two phase SRM. For example, the conventional 4/2 SRM experiences continuous flux reversals that cannot be eliminated. The absence of flux reversal in the stator 100, 102 leads to reduction of core losses, and hence, higher efficiency of operation for the proposed novel discontinuous core structure SRM, as exemplified by the E-core embodiment.

Figure 15:
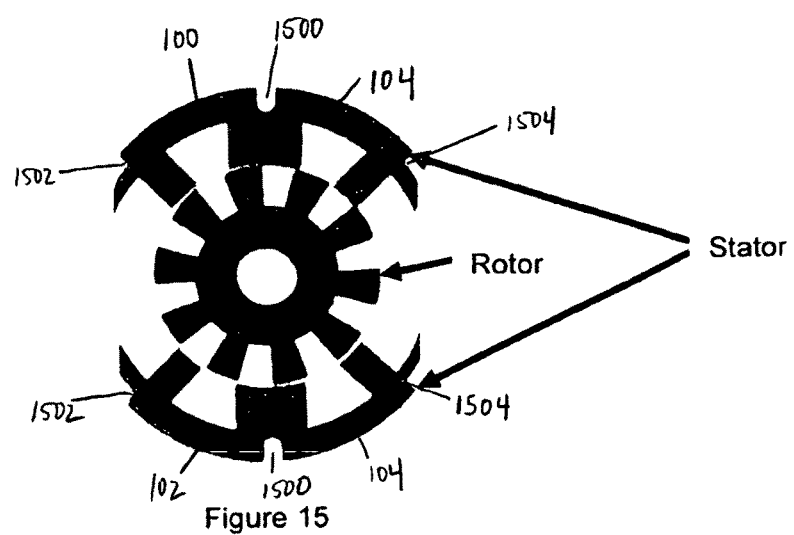
FIG. 15 is a photograph of laminations for the prototype motor shown in FIGS. 14(a)-(d)

FIGS. 14(a)-14(d) and FIG. 15 are photographs of exemplary embodiments of such novel and advantageous E-core SRM. Referring now to FIG. 15, in one embodiment of the present invention, the main outer segments 104 of the discontinuous core structures 100, 102 of the stator further contain a mounting notch 1500. In this particular embodiment, the mounting notch 1500 is positioned in the center of the main outer segments of each discontinuous core structure of the stator 100, 102 and serves as the place of contact between the stator laminations and the end bells of the SRM. Further, the mounting notch 1500 may be used to align the stator core structure relative to the rotor and other core structure. In some embodiments, notch 1500 fits into a separate physical structure enclosing or holding the SRM in place. In other embodiments, the notch 1500 may be used to insert a connecting element, such as a screw or post, that holds the core structure in place. Those skilled in the art will appreciate that the mounting notch 1500 may be placed in one or more other locations of main outer segment 104.

In addition to the mounting notch 1500, the main outer segments 104 of the discontinuous core structures 100, 102 each have, in this embodiment of the invention, a first and second notched end 1502, 1504. The first and second notched ends 1502, 1504 of each main outer segment 104 may be used to maintain the alignment of each discontinuous core structure 100, 102 to the rotor during assembly of the SRM assembled.

Figure 16:
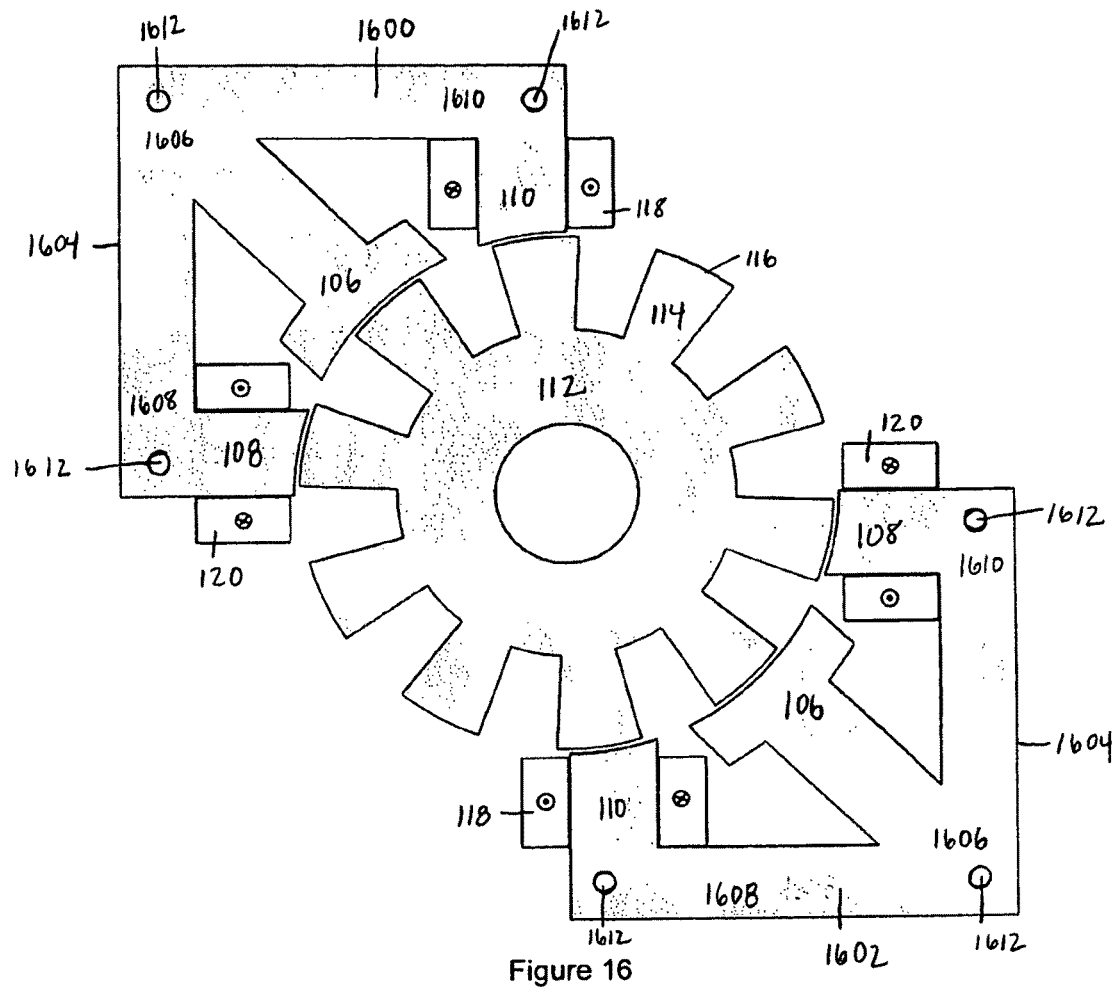
FIG. 16 is an exemplary two-phase common stator pole L-core structure that may be employed in a two-phase SRM drive in accordance with an embodiment of the present invention.

FIG. 16 shows a cross sectional view of an alternative embodiment of the invention referred to as the L-core configuration. This embodiment of the present invention has two discontinuous core structures 1600, 1602 each having a main outer segment 1604. As shown in FIG. 16, the two main outer segments 1604 of each discontinuous core structure in this exemplary embodiment of the present invention are in an angled configuration. The particular angle of the main outer segments in the illustrated embodiment is 90 degrees, but those skilled in the art will appreciate that other angles are contemplated by such L-core embodiments.

Referring back to FIG. 16, each angled main outer segment 1604 of the exemplary L-core configured discontinuous stator core structure 1600, 1602 has three sections: a corner section 1606 and two end sections 1608, 1610. Bolting holes 1612 are positioned along each main outer segment 1604 of the discontinuous core structures 1600, 1602. In one embodiment, bolting holes 1612 are placed in each of the corner section 1606 and the two end sections 1608, 1610, but alternative locations for bolting holes 1612 are possible so as to maintain structure integrity of the SRM. However, spacing such bolting holes 1612 widely along the angled main outer segment has acoustic dampening advantages as well.

The discontinuous stator core structures 1600, 1602 further comprise a common stator pole 106 without windings and two smaller stator poles 108, 110 with windings 118, 120. In this L-core configured embodiment, the common stator pole 106 extends from the corner section 1606 of the main outer segment 1604 of the discontinuous stator core structure 1600, 1602. The common stator pole 106 has an extension length defined from the angled main outer segment 1604 that is greater than the extension length of the smaller stator poles 108, 110. The rotor 112 has ten poles 114 with asymmetric pole faces 116 which form a non-uniform air gap with respect to a stator pole 108, 110 to produce positive motoring torque continuously.

The operation of this exemplary 6/10 L-core SRM is generally the same as that of the exemplary 6/10 E-core SRM disclosed above. In other words, each angled main outer segment 1604 comprised of three sections 1606, 1608, and 1610 does not change the principle of operation of the SRM as described above. Moreover, the bolting holes 1612 are advantageously positioned in the end bells of the ends 1608, 1610 and a portion of the corner 1606 such that they do not interfere or help to minimize any interference with the flux path and they do not introduce local saturation in the material of the stator core structure (e.g., iron) around the bolt holes. Thus, the material losses are not increased in this exemplary embodiment of the invention.

The angled configuration of the main outer segments 1604 of the discontinuous stator core structures 1600, 1602 along with the bolting holes 1612 provide mechanical robustness and a greater ability to maintain alignment with the rotor 112 while ensuring the designed constant air gap length between the common stator pole 106 and rotor pole 114. Moreover, the ease of assembly of the SRM is enhanced because the stator laminations can be stacked and pressed, the windings 118, 120 can then be inserted on these pressed lamination stacks, the rotor shaft and rotor laminations can be inserted with end bells, and finally, the stator lamination stacks can be bolted through the end bells of ends 1608, 1610.

Figure 17:
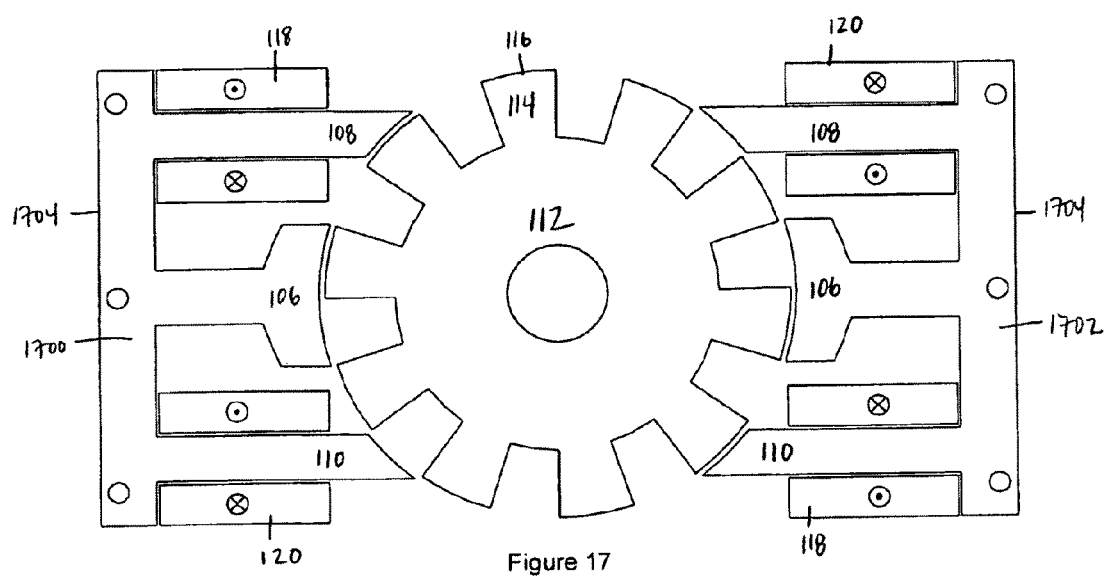
FIG. 17 is an exemplary two-phase common stator pole I-core structure that may be employed in a two-phase SRM drive in accordance with an embodiment of the present invention.

FIG. 17 shows a cross sectional view of yet another embodiment of the present invention referred to as the I-core configuration. This third exemplary embodiment of the invention has two discontinuous core structures 1700, 1702 each having a main outer segment 1704. The two main outer segments 1704 of each discontinuous core structure in this exemplary embodiment of the present invention are substantially straight. Each substantially straight main outer segment 1704 of the stator core structure 1700, 1702 of the exemplary I-core embodiment has one large, common stator pole 106 without windings and two smaller stator poles 108, 110 with windings 118, 120. The two smaller stator poles 108, 110 are positioned such that they are generally perpendicular to the substantially straight main outer segment 1704 of the I-core core structure (at least at the point where the poles join the main outer segment). The rotor 112 has ten poles 114 with asymmetric pole faces 116 which form a non-uniform air gap with respect to a stator pole 108, 110 to produce positive motoring torque continuously. The operation of this exemplary 6/10 I-core SRM is generally the same as that of the exemplary 6/10 E-core SRM disclosed above.

The substantially straight main outer segments 1704 of the discontinuous stator core structures 1700, 1702 of the exemplary I-core structure provides for an SRM that is very easy to manufacture and assemble. Because there is no curve in the substantially straight main outer segment 1704, more space is available to pack the windings 118, 120 during SRM assembly. Moreover, the substantially straight configuration of the main outer segment 1704 enables multiple discontinuous core structures 1700, 1702 to be cut from the same stator material piece thereby minimizing the waste of the stator material piece and resulting in additional cost savings. In other words, the layout footprint of the exemplary I-core structure optimizes the amount of material used during the manufacturing process and minimizes waste of such material.

Figure 18:
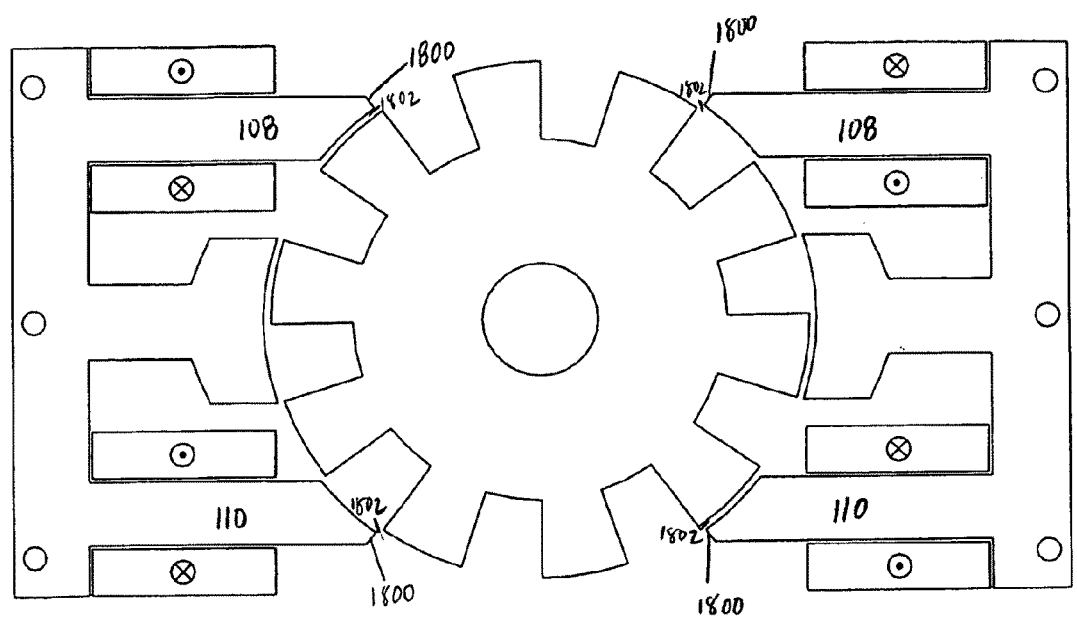
FIG. 18 is an exemplary two-phase common stator pole I-core structure with smaller stator poles having a beveled or curved edge near the air gap that may be employed in a two-phase SRM drive in accordance with an embodiment of the present invention.

Referring now to FIG. 18, in one possible embodiment of the I-core structure, the stator poles 108, 110 have a beveled or curved end 1800 near the air gap 1802 so that the cross sectional area of these stator poles is slightly higher than in other embodiments of the I-core configuration. Thus, higher flux can be carried in stator poles 108, 110 having this beveled or curved end 1800, leading to increased torque and power output. The operation of this exemplary 6/10 I-core SRM is generally the same as that of the exemplary 6/10 E-core SRM disclosed above. In other words, increasing the cross sectional area of the stator poles 108, 110 by beveling or curving the end 1800 of these stator poles near the air gap 1802 does not change the principle of operation of the SRM as described above.

Figure 19:
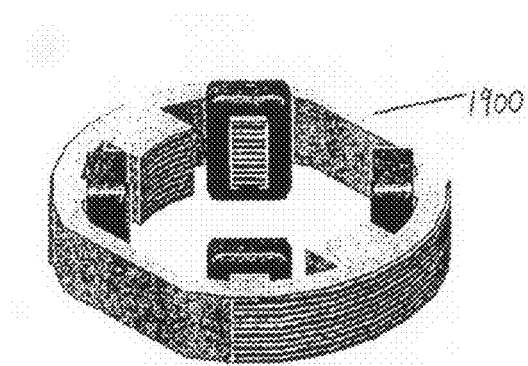
FIG. 19 is a side perspective view of a first exemplary physical assembly of the E-core segments using plastic molding in accordance with an embodiment of the present invention.
Figure 20:
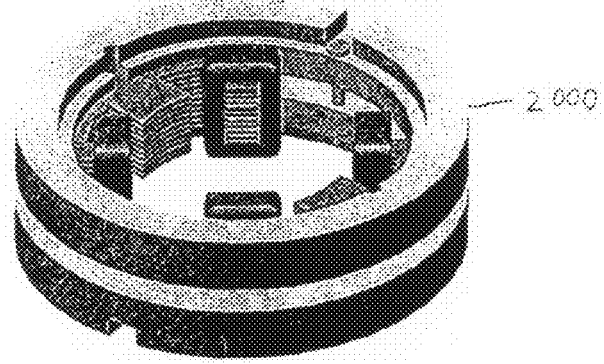
FIG. 20 is a side perspective view of a second exemplary physical assembly of the E-core segments using a sleeve-type fixture in accordance with an embodiment of the present invention.

Referring now to FIGS. 19 and 20, two possible exemplary physical structures for joining embodiments of the discontinuous core structures of the stator are illustrated. While these Figures illustrate such exemplary physical structures used to assembly and join discontinuous E-core configured stator core structure, those skilled in the art will readily appreciate that similar structures may be used for assembly of other embodiments of the stator core structure.

FIGS. 19 and 20 show ways in which the stator core structures may be assembled together. Specifically, FIG. 19 illustrates an exemplary plastic molding method or other stiff non-magnetic material. In some applications where acoustic noise and/or vibration are not critical, plastic molding 1900 is used to physically connect the discontinuous core structures of the stator (shown in FIG. 19). In such a case, there may be no need for slot insulation materials and their manufacturing processes.

FIG. 20 illustrates an exemplary sleeve-type structure as another possible assembly technique. This sleeve-type fixture 2000 may be assembled with a set of end bells (not shown) in order to hold a shaft including bearings for even more mechanical stability.

The present invention is not limited to the embodiments disclosed herein. Those skilled and knowledgeable in this field will readily appreciate that the principles of the present invention may include the following variations and other variations that can be understood from the basic inventions and their variations.

For example, the common stator pole in the discontinuous core structure may have excitation windings or no windings as illustrated in our discussion or may have windings in one discontinuous core structure common stator pole and may not have windings in the other common stator pole. Additionally, the pole numbers in the stator and rotor given in our discussion does not limit our invention to incorporate other possible beneficial combinations of stator and rotor poles. For example, any combination of rotor poles and stator poles may be employed, such that when a first rotor pole is aligned with a phase-excited stator pole, at least one other rotor pole is not aligned with a non-phase-excited stator pole. The present invention also is not limited to having only two discontinuous core structures with common stator poles; other combinations are possible should be noted. Finally, the present invention is not limited to two smaller stator poles per common stator pole based on a discontinuous core structure and may be designed with multiple smaller stator poles other than the currently illustrated two smaller stator poles per the above disclosed embodiments.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A two-phase switched reluctance machine (TPSRM), comprising:
a rotor having a plurality of rotor poles and a characteristic rotor pole pitch, each of the rotor poles having an arced surface;
a stator comprising first and second core structures, the first and second core structures each having a main outer segment, each of the core structures having first, second, and third stator poles extending from its main outer segment, and the main outer segments of the first and second core structures disconnected by a medium that is non-conducive to the direct conveyance of flux between the main outer segments;
first and second coils respectively disposed around the first and second stator poles of the first core structure, wherein:
conveyance of current through the first coil excites a first of the TPSRM's two phases,
conveyance of current through the second coil excites a second of the TPSRM's two phases, and
the third stator pole of each of the first and second core structures is a common stator pole that conveys flux throughout the excitation of each of the TPSRM's two phases, wherein a length of an arc on a tip of the common stator pole of each of the first and second core structures equals the rotor pole pitch.

2. The TPSRM of claim 1, wherein:
the common stator pole arc and the characteristic rotor pole pitch define an effective width of a flux path.

3. The TPSRM of claim 2, wherein:
each main outer segment is substantially shaped as an angle having a corner section and two end sections,
the first and second stator poles of each core structure are disposed near the two end sections of the respective main outer segment, and
the common stator pole of each core structure extends from the corner section of the respective main outer segment and has an extension length from the main outer segment that exceeds an extension length of the first and second stator poles.

4. The TPSRM of claim 2 wherein the reluctance of the effective air gap around each of the common stator poles is substantially constant for all rotational positions of the rotor relative to the stator.

5. The TPSRM of claim 1, wherein the first and second core structures are disposed diametrically opposite from one another.

6. The TPSRM of claim 1, wherein the rotor comprises ten rotor poles.

7. The TPSRM of claim 1, wherein each main outer segment is shaped in an arc relative to the rotor.

8. The TPSRM of claim 1, wherein each main outer segment is substantially shaped as an angle having a corner section and two end sections, the corner section disposed farther from the rotor than the two end sections of the main outer segment.

9. The TPSRM of claim 1, wherein:
each main outer segment is substantially straight, and
the stator poles of each main outer segment are disposed substantially perpendicular to the main outer segment.

10. The TPSRM of claim 1, wherein no flux reversal occurs in one of the stator poles of each core structure upon the excitation and de-excitation of the first and second coils with current.

11. A two-phase switched reluctance machine (TPSRM), comprising:
a rotor having a plurality of rotor poles and a characteristic rotor pole pitch, the characteristic rotor pole pitch representing a sum of a width of a rotor pole and a width of a slot defined between adjacent rotor poles;
a stator comprising first and second core structures, each of the first and second core structures being disconnected by a medium that is non-conducive to the direct conveyance of flux between the first and second core structures, each of the first and second core structures having a main outer segment shaped in an arced configuration and having respective stator poles through which magnetic flux can pass, wherein one stator pole of the respective stator poles for each of the first and second core structures is a common stator pole that conveys flux during the excitation of each of the TPSRM's two phases and includes a tip having an arced face, wherein the length of the arc on the common stator pole's tip face on each of the first and second core structures equals the rotor pole pitch; and
a plurality of concentric coils positioned around stator poles located on the first and second core structures, wherein
activation of a selected concentric coil causes the TPSRM to achieve a desired phase excitation.

12. The TPSRM of claim 11 wherein the reluctance of the effective air gap around each of the common stator poles is substantially constant for all rotational positions of the rotor relative to the stator.

13. A two-phase switched reluctance machine (TPSRM), comprising:
a rotor having a plurality of rotor poles and a characteristic rotor pole pitch, the characteristic rotor pole pitch representing a sum of a width of a rotor pole and a width of a slot defined between adjacent rotor poles;
a stator comprising first and second core structures, each of the first and second core structures being disconnected by a medium that is non-conducive to the direct conveyance of flux between the first and second core structures, each of the first and second core structures having a main outer segment shaped in an angled configuration and having respective stator poles through which magnetic flux can pass, wherein one stator pole of the respective stator poles for each of the first and second core structures is a common stator pole that conveys flux during the excitation of each of the TPSRM's two phases and includes a tip having an arced face, wherein the length of the arc on the common stator pole's tip face on each of the first and second core structures equals the rotor pole pitch; and
a plurality of concentric coils positioned around stator poles located on the first and second core structures, wherein
activation of a selected concentric coil causes the TPSRM to achieve a desired phase excitation.

14. The TPSRM of claim 13, wherein each of the first and second core structures further includes a plurality of bolting holes for securing the first and second core structures relative to the rotor.

15. The TPSRM of claim 14, wherein the plurality of bolting holes are positioned along the angled main outer segments of the first and second core structures, respectively, so as to minimize disturbance to the flux path.

16. The TPSRM of claim 13, wherein:
each angled main outer segment includes a corner section and two end sections, the stator poles of each main outer segment further include smaller stator poles adjacent to the common stator pole, and the common stator pole of each main outer segment extends from the corner section with an extension length defined from the angled main outer segment that exceeds an extension length associated with the smaller stator poles.

17. The TPSRM of claim 13 wherein the reluctance of the effective air gap around each of the common stator poles is substantially constant for all rotational positions of the rotor relative to the stator.

18. A two-phase switched reluctance machine (TPSRM), comprising:
a rotor having a plurality of rotor poles and a characteristic rotor pole pitch, the characteristic rotor pole pitch representing a sum of a width of a rotor pole and a width of a slot defined between adjacent rotor poles;
a stator comprising first and second core structures, each of the first and second core structures being disconnected by a medium that is non-conducive to the direct conveyance of flux between the first and second core structures, each of the first and second core structures having a main outer segment in a substantially straight configuration and having respective stator poles through which magnetic flux can pass, wherein one stator pole of the respective stator poles for each of the first and second core structures is a common stator pole that conveys flux during the excitation of each of the TPSRM's two phases and includes a tip having an arced face, wherein the length of the arc on the common stator pole's tip face on each of the first and second core structures equals the rotor pole pitch; and
a plurality of concentric coils positioned around stator poles located on the first and second core structures, wherein
activation of a selected concentric coil causes the TPSRM to achieve a desired phase excitation.

19. The TPSRM of claim 18, wherein each of the first and second core structures has a layout footprint that enables both structures to be cut from a stator material piece while minimizing resulting wasted product from the stator material piece.

20. The TPSRM of claim 18, wherein the first and second core structures further comprise at least one smaller stator pole adjacent to the common stator pole, the at least one smaller stator pole having a curved end, the curved end of the at least one smaller stator pole being dimensioned to carry a large flux path.

21. A two-phase switched reluctance machine (TPSRM) comprising:
a rotor having a core and a plurality of rotor poles;
first and second stator structures that are conducive to the conveyance of flux, the first stator structure having first, second, and third stator poles interconnected by a first stator back segment, the second stator structure having fourth, fifth, and sixth stator poles interconnected by a second stator back segment, and the first and second stator back segments disconnected by a medium that is non-conducive to the direct conveyance of flux between the first and second stator back segments, wherein a facial arc length of a tip of the third stator pole substantially equals a rotor pole pitch of the rotor poles;
a first winding wound around the first stator pole;
a second winding wound around the second stator pole; and
no winding wound around the third stator pole, wherein
as the rotor is rotated about its rotational axis for one revolution, an imaginary geometric ray that bisects any one of the rotor poles in a cross-sectional view of the TPSRM, extends from a fixed position on the rotational axis and perpendicular to the rotational axis, and rotates in concert with the rotor will sequentially intersect each stator pole of the first stator structure and sequentially intersect each stator pole of the second stator structure.

22. The TPSRM of claim 21, wherein:
for a first phase of the TPSRM, an electromagnetic flux flows through the first and third stator poles and two of the plurality of rotor poles while the first winding conveys current, and
for a second phase of the TPSRM, an electromagnetic flux flows through the second and third stator poles and two of the plurality of rotor poles while the second winding conveys current.

23. The TPSRM of claim 22, wherein no flux reversal occurs in the third stator pole during a transition from conveying current through the first winding to conveying current through the second winding.

24. The TPSRM of claim 22, further comprising:
a third winding wound around the fourth stator pole;
a fourth winding wound around the fifth stator pole; and
no winding wound around the sixth stator pole, wherein:
for the first phase of the TPSRM, an electromagnetic flux flows through the fourth and sixth stator poles and two of the plurality of rotor poles while the third winding conveys current, and
for the second phase of the TPSRM, an electromagnetic flux flows through the fifth and sixth stator poles and two of the plurality of rotor poles while the fourth winding conveys current.

25. The TPSRM of claim 21 wherein:
conveyance of current through the first winding excites a first of the TPSRM's two phases, and
conveyance of current through the second winding excites a second of the TPSRM's two phases.

26. The TPSRM of claim 21 wherein only one pair of the first, second, and third stator poles of the first stator back segment and only one pair of the fourth, fifth, and sixth stator poles of the second stator back segment are capable of producing torque at any particular time.

27. The TPSRM of claim 18 wherein the reluctance of the effective air gap around each of the common stator poles is substantially constant for all rotational positions of the rotor relative to the stator.

28. The TPSRM of claim 21, wherein the first and second stator structures only partially surround the rotor.

29. The TPSRM of claim 21, further comprising:
a plastic molding, wherein
the first and second stator structures are attached to the plastic molding.

30. The TPSRM of claim 21, further comprising:
a sleeve-type fixture, wherein
the first and second stator structures are attached to the sleeve-type fixture.

31. The TPSRM of claim 21, wherein each of the first and second stator back segments comprises a mounting notch.

32. The TPSRM of claim 21, wherein:
each of the first and second stator back segments comprises a first notched end and a second notched end, and
the first notched end and the second notched end maintain alignment of the respective first and second stator structures relative to the rotor.

33. The TPSRM of claim 21, wherein each of the first and second stator back segments has an arc configuration.

34. The TPSRM of claim 21, wherein each of the first and second stator back segments has an angled configuration.

35. The TPSRM of claim 21, wherein:
each of the first and second stator back segments has a substantially straight configuration, and
the stator poles of each of the first and second stator structures are disposed perpendicular to their respective first and second stator back segments.

36. A two-phase switched reluctance machine (TPSRM) comprising:
a rotor having a core and a plurality of rotor poles, each rotor pole having a characteristic rotor pole representing a sum of a width of a rotor pole and a width of a slot defined between adjacent rotor poles; and
first and second stator structures that are conducive to the conveyance of flux, the first stator structure having first, second, and third stator poles interconnected by a first stator back segment, the second stator structure having fourth, fifth, and sixth stator poles interconnected by a second stator back segment, and the first and second stator back segments disconnected by a medium that is non-conducive to the direct conveyance of flux between the first and second stator back segments, wherein:
each of the third and sixth stator poles is common to the two-phases, so as to convey flux during the excitation of each of the TPSRM's two phases, each of the third and sixth stator poles comprising a tip having an arced face, wherein the length of the arc equals the rotor pole pitch, and
when the first stator pole and a particular one of the rotor poles are aligned so as to minimize the reluctance between them, the third stator pole and another of the rotor poles are aligned so as to minimize the reluctance between them.

37. The TPSRM of claim 36, wherein when the second stator pole and a particular one of the rotor poles are aligned so as to minimize the reluctance between them, the third stator pole and another of the rotor poles are aligned so as to minimize the reluctance between them.

38. The TPSRM of claim 36, wherein the reluctance of the effective air gap around each of the common stator poles is substantially constant for all rotational positions of the rotor relative to the stator.

39. A two-phase switched reluctance machine (TPSRM) comprising:
a rotor having a core and a plurality of rotor poles, each rotor pole having a characteristic rotor pole representing a sum of a width of a rotor pole and a width of a slot defined between adjacent rotor poles;
first and second stator structures that are conducive to the conveyance of flux, the first stator structure having first, second, and third stator poles interconnected by a first stator back segment, the second stator structure having fourth, fifth, and sixth stator poles interconnected by a second stator back segment, and the first and second stator back segments disconnected by a medium that is non-conducive to the direct conveyance of flux between the first and second stator back segments, wherein the third stator pole is common to the two-phases, so as to convey flux during excitation of each of the TPSRM's two phases, the third stator pole comprising a tip having an arced face, wherein the length of the arc equals the rotor pole pitch;
a first winding wound around the first stator pole;
a second winding wound around the second stator pole; and
no winding wound around the third stator pole, wherein
as the rotor is rotated about its rotational axis for one revolution, each of the plurality of rotor poles sequentially aligns with each stator pole of the first and second stator structures so as to minimize the reluctance of the effective air gap between the aligned poles.

\* \* \* \* \*